US010412663B2

United States Patent
Eskildsen et al.

(10) Patent No.: US 10,412,663 B2
(45) Date of Patent: Sep. 10, 2019

(54) SYSTEMS AND METHODS FOR DETECTING AND AVOIDING RADIO INTERFERENCE IN A WIRELESS SENSOR NETWORK

(71) Applicant: Honeywell International Inc., Morristown, NJ (US)

(72) Inventors: Kenneth Eskildsen, Great Neck, NY (US); Sandeep Suresh, Bangalore (IN); Thomas Winkeler, Saint James, NY (US)

(73) Assignee: ADEMCO INC., Golden Valley, MN (US)

( * ) Notice: Subject to any disclaimer, the term of this patent is extended or adjusted under 35 U.S.C. 154(b) by 131 days.

(21) Appl. No.: 15/464,687

(22) Filed: Mar. 21, 2017

(65) Prior Publication Data

US 2018/0279208 A1    Sep. 27, 2018

(51) Int. Cl.
*H04W 48/10* (2009.01)
*H04L 1/00* (2006.01)
*H04W 24/08* (2009.01)
*H04W 4/70* (2018.01)
*H04B 17/318* (2015.01)
(Continued)

(52) U.S. Cl.
CPC .......... *H04W 48/10* (2013.01); *H04B 17/318* (2015.01); *H04B 17/345* (2015.01); *H04L 1/00* (2013.01); *H04W 4/70* (2018.02); *H04W 24/08* (2013.01); *H04W 52/0258* (2013.01); *H04W 72/0453* (2013.01); *H04W 24/10* (2013.01); *H04W 84/12* (2013.01); *H04W 84/18* (2013.01);
(Continued)

(58) Field of Classification Search
CPC ... H04W 48/10; H04W 4/70; H04W 52/0258; H04W 84/18; H04B 17/318; H04B 17/345

See application file for complete search history.

(56) References Cited

U.S. PATENT DOCUMENTS 6,377,608 B1    4/2002 Zyren
7,817,612 B2    10/2010 Morioka
(Continued)

OTHER PUBLICATIONS

Extended European search report for corresponding EP patent application 18155938.6, dated May 11, 2018.

*Primary Examiner* — Ian N Moore
*Assistant Examiner* — Latresa A McCallum
(74) *Attorney, Agent, or Firm* — Husch Blackwell LLP

(57) ABSTRACT

Some methods for detecting and avoiding radio interference in a wireless sensor network can include an access point device periodically transmitting a beacon message to a plurality of IoT enabled devices via a radio channel, upon receipt of the beacon message, an IoT enabled device attempting to decode the beacon message, the IoT enabled device measuring and storing a signal strength of a successfully decoded beacon message as signal strength data in a memory of the IoT enabled device, the IoT enabled device increasing a missed beacon counter stored in the memory of the IoT enabled device responsive to a beacon message that cannot be decoded, each of the plurality of IoT enabled devices periodically transmitting stored data to the access point device, and the access point device using the received data to identify an interference source, or an interference issue or a fading issue on the radio channel.

18 Claims, 1 Drawing Sheet

(51) Int. Cl.
   *H04B 17/345*  (2015.01)
   *H04W 52/02*   (2009.01)
   *H04W 72/04*   (2009.01)
   H04W 24/10    (2009.01)
   H04W 84/12    (2009.01)
   H04W 84/18    (2009.01)

(52) U.S. Cl.
   CPC ............ *Y02D 70/00* (2018.01); *Y02D 70/142* (2018.01); *Y02D 70/162* (2018.01)

(56) References Cited

U.S. PATENT DOCUMENTS

| | | | |
|---|---|---|---|
| 7,974,230 B1 * | 7/2011 | Talley | H04W 52/325 370/318 |
| 8,315,573 B2 | 11/2012 | Bishop | |
| 9,072,107 B2 * | 6/2015 | Gauvreau | H04W 72/082 |
| 9,124,359 B2 | 9/2015 | Ho | |
| 2007/0247366 A1 | 10/2007 | Smith et al. | |
| 2012/0172673 A1 | 7/2012 | Friedman et al. | |
| 2013/0077554 A1 | 3/2013 | Gauvreau et al. | |
| 2014/0233443 A1 | 8/2014 | Kumar | |
| 2016/0269971 A1 * | 9/2016 | Kim | H04W 16/14 |

\* cited by examiner

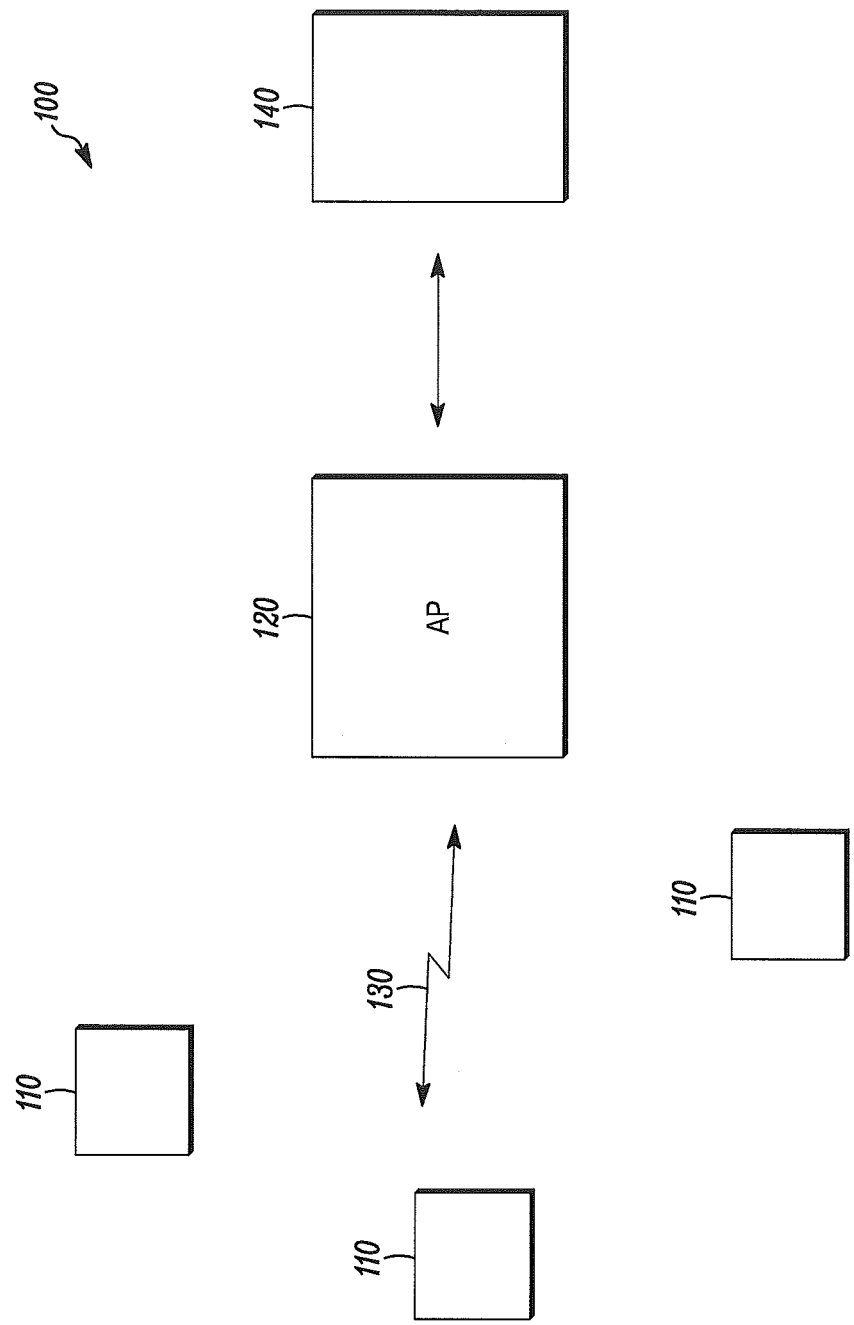

SYSTEMS AND METHODS FOR DETECTING AND AVOIDING RADIO INTERFERENCE IN A WIRELESS SENSOR NETWORK

FIELD

The present invention relates generally to wireless sensor networks. More particularly, the present invention relates to systems and methods for detecting and avoiding radio interference in a wireless sensor network.

BACKGROUND

Many consumer electronic devices, such as household items, are Internet of Things (IoT) enabled devices such that these devices have the ability to connect to the Internet so that data can be collected and exchanged via the Internet. Furthermore, many IoT enabled devices are wirelessly connected to the Internet so that each device does not need a cable tethered to a router.

Known IoT enabled devices communicate using one or more communication protocols, including, for example, WiFi, 6LowPan, Zigbee PRO, Zigbee iControl, and Thread. Although there are different protocol standards for IoT device communication, all known IoT enabled devices use the 2.4 GHz radio band to communicate, thereby potentially causing harmful interference to each other. Furthermore, because communication between IoT enabled devices is primarily burst mode communication, inter-device interference resulting from such communication is difficult to detect with traditional RF jamming detection algorithms. For these and other reasons, the co-existence of devices communicating on the 2.4 GHz radio band is an issue that can cause poor RF performance for all such devices present in a region.

In view of the above, there is a continuing, ongoing need for improved systems and methods.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for detecting and avoiding radio interference in a wireless sensor network. For example, some systems and methods disclosed herein can include detecting IoT enabled devices that communicate on the 2.4 GHz radio band and assuring reliable communication between such devices without user intervention. Indeed, systems and methods disclosed herein advantageously can detect interference on the 2.4 GHz radio band upon occurrence of the interference and, unlike known systems and methods, not wait to detect interference until an event message is not delivered. Accordingly, systems and methods disclosed herein can facilitate a user addressing interference problems by taking corrective action before a critical event, such as a fire or attack, occurs.

In accordance with disclosed embodiments, an access point device can transmit periodic beacon messages on a communication radio channel to an IoT enabled device to test the integrity of the radio channel to the IoT enabled device. For example, in some embodiments, the access point device can transmit the beacon message every quarter of a second or 240 beacons per minute, and each IoT enabled device in communication with the access point device can know when a beacon is sent so as to wake up or exit a low power sleep state to receive the beacon message or to count a missed beacon.

When an IoT enabled device receives a beacon message, the IoT enabled device can check the beacon message for accuracy and the signal strength of the beacon message and record the same in a memory of the IoT enabled device. When there is detrimental interference on the radio channel that carried the beacon message, the beacon message will be corrupted, and the IoT enabled device will be unable to decode the beacon message. This can be referred to as a missed beacon message. The IoT enabled device can count and store the number of missed beacons received from the access point device, can store the signal strength of received and decoded beacon messages, and can periodically transmit such missed beacon and signal strength data to the access point device and/or to a central control processor for analysis thereof. For example, in some embodiments, the interference can be intermittent, and the IoT enabled device can transmit the missed beacon and signal strength data during one or more time periods of minimal interference.

For example, the access point device and/or the central control processor can process data received from one or more IoT enabled devices and, when a particular IoT enabled device is experiencing a high rate of missed beacons, for example, more than a predetermined threshold amount, determine that the particular IoT enabled device is too close to an interference source and should be moved to another location. However, when many IoT enabled devices, for example, more than a predetermined threshold amount, are experiencing a high rate of missed beacons, the access point device and/or the central control processor can determine that there is interference on a first 2.4 GHz channel on which communication in the system of which the IoT enabled devices is occurring and that such communication should be moved from the first 2.4 GHz channel to a second, different 2.4 GHz channel.

In some embodiments, fluctuations in the signal strength of beacon messages received by an IoT enabled device as disclosed and described herein can indicate the amount of fading occurring in the radio channel that carried those beacon messages. Accordingly, when the signal strength of beacon messages received by many IoT enabled devices, for example, more than a predetermined amount, is lower than a minimum required signal strength threshold amount, the access point and/or the central monitoring processor can determine that there is fading occurring on a first 2.4 GHz channel on which communication in the system of which the IoT enabled devices are a part is occurring and that such communication should be moved from the first 2.4 GHz channel to a second, different, 2.4 GHz channel. However, when the signal strength of beacon messages received by only a particular IoT enabled device is lower than a minimum required signal strength, the access point and/or the central monitoring processor can determine that the particular IoT enabled device is too close to an interference source and should be moved to another location.

In some embodiments, the fluctuations in the signal strength of beacon messages received by an IoT enabled device as disclosed and described herein can also be indicative of movement within a region. Accordingly, the access point device and/or the central monitoring processor can aggregate the signal strength data for all IoT enabled devices in a system and use the aggregated data to determine the number of people in the region and the movement of those people within the region. Such determinations can be used, for example, when monitoring elderly people or when responding to a fire or burglary, for example, by directing first responders to where people are located or by tracking the path of an intruder.

FIG. 1 is a block diagram of a system 100 in accordance with disclosed embodiments. As seen in FIG. 1, the system 100 can include a plurality of wireless IoT enabled sensors or devices 110 in communication with an access point device 120 on a radio channel 130. In some embodiments, the access point device 120 can transmit an RF beacon message on the radio channel 130 every quarter of a second, and each of the plurality of wireless IoT enabled sensors or devices 110 can wake up or exit a low power sleep state when the access point device 120 transmits the beacon message to receive and decode the beacon message.

Upon receipt of a beacon message, if an IoT enabled sensor or device 110 can decode the beacon message, then the IoT enabled sensor or device 110 can measure and store a signal strength of the beacon message in a memory of the IoT enabled sensor or device 110. However, upon receipt of a beacon message, if an IoT enabled sensor or device 110 cannot decode the beacon message, then the IoT enabled sensor or device 110 can increase a missed beacon counter in the memory of the IoT enabled sensor or device 110. Each of the plurality of IoT enabled sensors or devices 110 can accumulate and store measured signal strengths and the missed beacon counter until such data is requested from the access point device 120.

For example, the access point device 120 can request and receive the measured signal strength data and/or the missed beacon data from each of the plurality of IoT enabled sensors or devices 110. Then, the access point device 120 can process the received data or transmit the received data to a central monitoring processor 140 for processing thereof as disclosed and described above and herein. After one of the plurality of IoT enabled sensors or devices 110 transmits the missed beacon data to the access point 120, that sensor or device 110 can reset its missed beacon counter to zero to reset the count of missed beacons received by that sensor or device 110.

It is to be understood that each of the plurality of IoT enabled sensors or devices 110, the access point 120, and the central monitoring processor 140 as disclosed and described herein can include a transceiver device and a memory device each of which can be in communication with respective control circuitry, one or more programmable processors, and executable control software as would be understood by one of ordinary skill in the art. The executable control software can be stored on a transitory or non-transitory computer readable medium, including, but not limited to local computer memory, RAM, optical storage media, magnetic storage media, flash memory, and the like.

In some embodiments, some or all of the control circuitry, programmable processor, and control software can execute and control at least some of the methods disclosed and described above and herein. For example, in some embodiments, some or all of the control circuitry, programmable processor, and control software can control the transmission and reception of beacon messages, can identify when a beacon message is a missed beacon, can count the number of missed beacons, can decode beacon messages, can measure the signal strength of decoded beacon messages, can store measured signal strength data and missed beacon data, can control the transmission and reception of measured signal strength data and missed beacon data, and can analyze measured signal strength data or missed beacon data to identify an interference source proximate a device, to identify interference on a radio channel, to identify fading on a radio channel, or to identify a number and movement of people in an ambient region.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   an access point device periodically transmitting a beacon message to a plurality of internet of things (IoT) enabled devices via a radio channel;
   upon receipt of the beacon message, each of the plurality of IoT enabled devices attempting to decode the beacon message;
   when the beacon message is decoded successfully, each of the plurality of IoT enabled devices measuring and storing a respective measured signal strength of the beacon message as respective signal strength data in a respective memory of a respective one of the plurality of IoT enabled devices;
   when the beacon message cannot be decoded, each of the plurality of IoT enabled devices increasing a respective missed beacon counter stored in the respective memory of the respective one of the plurality of IoT enabled devices;
   each of the plurality of IoT enabled devices periodically transmitting the respective signal strength data and a respective number of the respective missed beacon counter to the access point device;
   the access point device using the respective signal strength data or the respective number of the respective missed beacon counter from each of the plurality of IoT enabled devices to identify an interference source, an interference issue on the radio channel, or a fading issue on the radio channel;
   the access point device identifying a respective fluctuation amount of the respective signal strength data from each of the plurality of IoT enabled devices; and
   the access point device determining that a first of the plurality of IoT enabled devices is proximate the interference source when the respective fluctuation amount for the first of the plurality of IoT enabled devices is lower than a first predetermined threshold.

2. The method of claim 1 wherein the radio channel operates in a 2.4 GHz frequency band.

3. The method of claim 1 further comprising the access point device transmitting the beacon message every quarter of a second.

4. The method of claim 1 further comprising each of the plurality of IoT enabled devices periodically exiting a low power sleep state to receive the beacon message.

5. The method of claim 1 further comprising the access point device determining that a first of the plurality of IoT enabled devices is proximate the interference source when the respective number of the respective missed beacon counter from the first of the plurality of IoT enabled devices is higher than a second predetermined threshold.

6. The method of claim 1 further comprising the access point device identifying the interference issue on the radio channel when the respective number of the respective missed beacon counter from a predetermined number of the plurality of IoT enabled devices is higher than a second predetermined threshold.

7. The method of claim 1 further comprising:
the access point device identifying the fading issue on the radio channel when the respective fluctuation amount from a predetermined number of the plurality of IoT enabled devices is lower than a second predetermined threshold.

8. The method of claim 1 further comprising:
the access point device aggregating the respective signal strength data from each of the plurality of IoT enabled devices; and
the access point device identifying a presence, a number, or a movement of people or objects within an ambient region based on the respective fluctuation amount from each of the plurality of IoT enabled devices.

9. The method of claim 1 further comprising each of the plurality of IoT enabled devices periodically transmitting the respective signal strength data and the respective number of the respective missed beacon counter to the access point device responsive to a request message from the access point device.

10. A system comprising:
an access point device; and
a plurality of internet of things (IoT) enabled devices in communication with the access point device via a radio channel,
wherein the access point device periodically transmits a beacon message to each of the plurality of IoT enabled devices via the radio channel,
wherein, upon receipt of the beacon message, each of the plurality of IoT enabled devices attempts to decode the beacon message,
wherein, when the beacon message is decoded successfully, each of the plurality of IoT enabled devices measures and stores a respective signal strength of the beacon message as respective signal strength data in a respective memory of a respective one of the plurality of IoT enabled devices,
wherein, when the beacon message cannot be decoded, each of the plurality of IoT enabled devices increases a respective missed beacon counter stored in the respective memory of the respective one of the plurality of IoT enabled devices,
wherein each of the plurality of IoT enabled devices periodically transmits the respective signal strength data and a respective number of the respective missed beacon counter to the access point device,
wherein the access point device uses the respective signal strength data or the respective number of the respective missed beacon counter from each of the plurality of IoT devices to identify an interference source, an interference issue on the radio channel, or a fading issue on the radio channel,
wherein the access point device identifies a respective fluctuation amount of the respective signal strength data from each of the plurality of IoT enabled devices; and
the access point device determining that a first of the plurality of IoT enabled devices is proximate the interference source when the respective fluctuation amount for the first of the plurality of IoT enabled devices is lower than a first predetermined threshold.

11. The system of claim 10 wherein the radio channel operates in a 2.4 GHz frequency band.

12. The system of claim 10 wherein the access point device transmits the beacon message every quarter of a second.

13. The system of claim 10 wherein each of the plurality of IoT enabled devices periodically exits a low power sleep state to receive the beacon message.

14. The system of claim 10 wherein the access point device determines that a first of the plurality of IoT enabled devices is proximate the interference source when the respective number of the respective missed beacon counter from the first of the plurality of IoT enabled devices is higher than a second predetermined threshold.

15. The system of claim 10 wherein the access point device identifies the interference issue on the radio channel when the respective number of the respective missed beacon counter from a predetermined number of the plurality of IoT enabled devices is higher than a second predetermined threshold.

16. The system of claim 10 wherein the access point device identifies the fading issue on the radio channel when the respective fluctuation amount from a predetermined number of the plurality of IoT enabled device is lower than a second predetermined threshold.

17. The system of claim 10 wherein the access point device aggregates the respective signal strength data from each of the plurality of IoT enabled devices, and identifies a presence, a number, or a movement of people or objects within an ambient region based on the respective fluctuation amount from each of the plurality of IoT enabled devices.

18. The system of claim 10 wherein each of the plurality of IoT enabled devices periodically transmits the respective signal strength data and the respective number of the respective missed beacon counter to the access point device responsive to a request message from the access point device.

* * * * *